United States Patent Office 3,478,133
Patented Nov. 11, 1969

3,478,133
CYCLIC PHOSPHATE ESTERS AND PROCESS
FOR PRODUCING SAME
Yasuyoshi Oshima and Morifusa Eto, Fukuoka-shi,
Japan, assignors to Sumitomo Chemical Company,
Ltd., Osaka, Japan, a corporation of Japan
No Drawing. Filed Oct. 21, 1966, Ser. No. 588,340
Claims priority, application Japan, Oct. 29, 1965,
40/66,559
Int. Cl. C07d $105/04$
U.S. Cl. 260—937                                    14 Claims

ABSTRACT OF THE DISCLOSURE

Cyclic thionophosphate esters represented by the formula

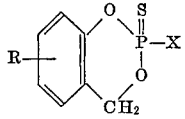

wherein X is methoxy, alkylthio having 1 to 4 carbon atoms, allylthio, phenylthio, mono-lower alkyl-substituted amino or di-lower alkyl-substituted amino, and R is hydrogen, chlorine or methyl, are produced in high yield by reacting an o-hydroxybenzyl alcohol represented by the formula

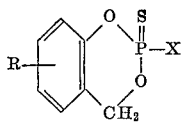

wherein R has the same meaning as defined above, with mono-substituted thiophosphoryl chloride represented by the formula

wherein X has the same meanings as defined above, in a sodium or potassium hydroxide aqueous solution. These new compounds have excellent insecticidal properties.

---

This invention relates to a process for producing cyclic phosphate esters having excellent pesticidal activity.

The present inventors have already obtained the French Patent Numbers 1,360,130 and 1,408,408 as to the present compounds. The French Patent No. 1,360,130 discloses a process for producing cyclic phosphate esters according to the following chemical reaction formula,

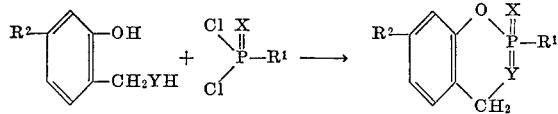

wherein $R^1$ means an alkoxy having not more than 4 carbon atoms; $R^2$ means hydrogen or an alkyl; X means oxygen or sulfur atom and Y means oxygen or the radical represented by the following formula,

wherein A means hydrogen, phenyl or nitrophenyl, and the pesticidal activity thereof.

The French Patent No. 1,408,408 discloses a process for producing cyclic phosphoroamidate compounds represented by the following formula,

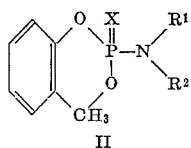

wherein $R^1$ means hydrogen, alkyl or aryl; $R^2$ means hydrogen or alkyl and X means oxygen or sulfur, and the pesticidal activity thereof. The process of the French Patent No. 1,408,408 is similar to the process of the French Patent No. 1,360,130.

In the process of these French patents, the reaction is carried out in a dry solvent such as chloroform or toluene in the presence of a dehydrochlorinating agent such as a tertiary amine, or in some cases, where the reaction is effected difficultly by using the tertiary amine, the reaction is effected by heating the reaction mixture for e.g. 10 to 20 hours in the presence of anhydrous potassium carbonate together with copper powder instead of a tertiary amine.

Such compound, which is difficultly produced by the method employing a tertiary amine, includes the compound having meanings of X=S and $R^1$=methoxy in the Formula I; and X=S, $R^1$=H and $R^2$=alkyl having more than 1 carbon atom or $R^1$=$R^2$=alkyl in the Formula II.

The process employing potassium carbonate is effected by a reaction between liquid phase and solid phase, therefore even if potassium carbonate is employed as finely divided powder often the process employing potassium carbonate causes a remarkable lowering and fluctuation of the yield.

For example, in case of saligenin cyclic thionophosphate such as 2-methoxy-4H-1,3,2-benzodioxaphosphorin-2-sulfide, which is the most important compound as pesticide, the process requires heating a non-aqueous reaction mixture for a long period of time in a dry solvent such as toluene in the presence of anhydrous potassium carbonate together with copper powder as catalyst, and although the yield is 20% to 60%, the reproductivity of the yield is low and it is a very rare case that the high yield such as 60% is obtained, and in many cases the yield is poor as low as 20 to 30% and the fluctuation of the yield is very large.

The present inventors studied the process for producing cyclic phosphate esters which are difficultly or not produced by the method employing a tertiary amine, and found that a pure objective product is always obtained in good yield with small fluctuation of yield in a shorter reaction period of time by proceeding the reaction in an aqueous medium in the presence of a caustic alkali at a low temperature.

One object of this invention is to provide an improved process for producing cyclic phosphate esters which are difficultly or not produced by a process employing tertiary amine, which process always gives pure cyclic phosphate esters in good yield by a simple method. Another object is to provide an improved process for producing, particularly, 2 - methoxy-4H-1,3,2-benzodioxaphosphorin-2-sulfide of the formula,

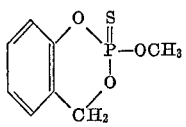

in good yield by a simple method. Other objects will be apparent from the following descriptions.

In order to accomplish these objects, the present invention provides a process for producing cyclic thionophosphate esters represented by the following formula,

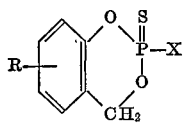

wherein X means methoxy, a lower alkylthio having one to four carbon atoms, a lower alkenylthio having one to four carbon atoms, phenylthio or the radical represented by the formula,

wherein $R^1$ means a lower alkyl having two to four carbon atoms, or the radical represented by the formula,

wherein $R^2$ and $R^3$ mean a lower alkyl having one to four carbon atoms; and R means hydrogen, chlorine or methyl, which comprises reacting o-hydroxybenzyl alcohol or its derivative represented by the following formula,

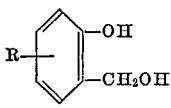

wherein R has the same meanings as identified above, with mono-substituted thiophosphoryl chloride represented by the following formula,

wherein X has the same meanings as identified above, in a caustic alkali aqueous solution.

The present process is superior to the known process in the views of the following points.

That is, the present process is carried out in an aqueous solution at a lower temperature and in a shorter reaction time than the known process. And by the present process an objective product having higher purity is always obtained in a better yield than the known process.

Further, it is possible in the present process to produce cyclic dithiophosphate esters which can not be produced by the known process. Therefore the present process is more widely applied than the known process.

The following Table 1 shows the results of several comparisons of the present process with the known process.

TABLE 1

| | Process | |
|---|---|---|
| | Present Process | Known Process* |
| Solvent | Water | Toluene |
| Condensation agent | Sodium hydroxide | Anhydrous potassium carbonate plus Copper powder |
| Reaction temperature (° C.) | 10–30 | 80–90 |
| Reaction time (hours) | 2–3 | 15–20 |
| Yields (percent): | | |
| (structure with —OCH₃) | 60–70 | 20–60 |
| (structure with —N(CH₃)₂) | 60 | 27 |
| (structure with —S-n·C₃H₇) | 50 | 0 |

*The process described in the French Patent numbers 1,360,130 and 1,408,408.

In carrying out the process of the present invention the order of addition of o-hydroxybenzyl alcohol or its derivative, mono-substituted thiophosphoryl chloride and caustic alkali aqueous solution is optional except that mono-substituted thiophosphoryl chloride and caustic alkali are contacted directly.

Preferably, o-hydroxybenzyl alcohol or its derivative is added in a caustic alkali aqueous solution and the reaction mixture is stirred vigorously and to the reaction mixture mono-substituted thiophosphoryl chloride is added.

A good result is obtained too, by the method in which mono-substituted thiophosphoryl chloride and caustic alkali aqueous solution are added to o-hydroxybenzyl alcohol or its derivative at the same time in parallel with each other while keeping the molar ratio of mono-substituted thiophosphoryl chloride and caustic alkali 1:2 without contacting both of them before addition to the reaction mixture.

The caustic alkali employed in the present invention includes sodium hydroxide and potassium hydroxide, among which sodium hydroxide is more preferable and practical.

Usually the reaction proceeds smoothly under vigorous stirring at a temperature between 0° C. and 50° C. preferably between 5° C. and 30° C. The reaction temperature may be varied within the above range depending upon the kinds of reaction raw materials. If the reaction proceeds difficultly the reaction mixture may be heated up to 50° C.

The reaction is completed within at least three hours, in many cases preferably within one to two hours.

The molar ratio of o-hydroxybenzyl alcohol or its derivative, sodium hydroxide and mono-substituted thiophosphoryl chloride is 1:2–4:1–1.5. The concentration of the caustic alkali aqueous solution is 1 to 40%, preferably 10 to 30% (by weight).

It is possible to recover unreacted o-hyroxybenzyl alcohol from the reaction mixture by neutralizing the reaction mixture with an acid after the objective product is removed therefrom.

After the reaction is over, a suitable solvent such as chloroform or toluene is added to the reaction mixture and the organic layer is separated and washed with dilute caustic alkali aqueous solution then with dilute hydrochloric acid finally with water and after dried over sodium sulfate the organic solvent is removed under the reduced pressure to yield the product as the residue. Alternatively, the solvent such as chloroform or toluene may be added to the reaction mixture before the start of the reaction, on the way of reaction, or mono-substituted thiophosphoryl chloride is dissolved in the solvent and the solution is added to the reaction mixture.

It is possible, also, to obtain the product only by collecting the precipitates, if the product is solid, through the filtration of the reaction mixture.

A pure product is obtained if necessary, by recrystallization from a suitable solvent or vacuum distillation.

The cyclic phosphate esters which are produced by the present improved process include, for example 2-methoxy-4H-1,3,2-benzodioxaphosphorin-2-sulfide,
2-methoxy-8-methyl-4H-1,3,2-benzodioxaphosphorin-2-sulfide,
2-methoxy-6-methyl-4H-1,3,2-benzodioxaphosphorin-2-sulfide,
2-methoxy-8-chloro-4H-1,3,2-benzodioxaphosphorin-2-sulfide,
2-methoxy-6-chloro-4H-1,3,2-benzodioxaphosphorin-2-sulfide,
2-methylthio-4H-1,3,2-benzodioxaphosphorin-2-sulfide,
2-ethylthio-4H-1,3,2-benzodioxaphosphorin-2-sulfide,
2-isopropylthio-4H-1,3,2-benzodioxaphosphorine-2-sulfide,
2-butylthio-4H-1,3,2-benzodioxaphosphorin-2-sulfide,
2-allylthio-4H-1,3,2-benzodioxaphosphorin-2-sulfide,
2-phenylthio-4H-1,3,2-benzodioxaphosphorin-2-sulfide,
2-ethylamino-4H-1,3,2-benzodioxaphosphorin-2-sulfide,
2-dimethylamino-4H-1,3,2-benzodioxaphosphorin-2-sulfide, and
2-diethylamino-4H-1,3,2-benzodioxaphosphorin-2-sulfide.

The following examples are given not to limit the present invention but only to illustrate the present invention.

EXAMPLE 1

6.2 grams of o-hydroxybenzyl alcohol was dissolved in 30–40 ml. of 20% (by weight) sodium hydroxide aqueous solution. During the reaction mixture was stirred vigorously and the temperature of the reaction mixture was kept at about 10° C., 8.3–11 g. of methyl phosphorodichloridothionate was added dropwise in the reaction mixture. After the addition stirring was continued for one hour, as a result, crystals were separated. 70 ml. of chloroform or toluene was added to the reaction mixture and the stirring was continued for additional one hour. The organic layer was separated and washed with 2% (by weight) sodium hydroxide aqueous solution, 0.5 N-hydrochloric acid and water and dried over anhydrous sodium sulfate. When the solvent was removed and the residue was cooled, as a result, the residue became crystals. By collecting the crystals 6.5–7.6 g. (yield 60–70% based on o-hydroxybenzyl alcohol) of crude 2-methoxy-4H-1,3,2-benzodioxaphosphorin-2-sulfide was obtained. If necessary, the crude product was recrystallized from methanol to yield the pure crystals of the product, M.P. 52° C.

EXAMPLE 2

6.2 grams of o-hydroxybenzyl alcohol was dissolved in 40 ml. of 20% (by weight) sodium hydroxide aqueous solution. During the reaction mixture was stirred vigorously and the temperature of the reaction mixture was kept at about 10° C., 9 g. of dimethylphosphoroamidothioic dichloride was added dropwise. After the addition the stirring was continued for two hours. The reaction product was extracted with chloroform and after the extract was washed and dried and the solvent was removed in the similar way of Example 1. The residue was distilled in vacuo, and the fraction of distillate having the boiling point from 120° C./0.2 mm. Hg to 122° C./0.2 mm. Hg was collected. Thus 6.8 g. (yield 60% based on o-hydroxybenzylalcohol) of 2-dimethylamino-4H-1,3,2-benzodioxaphosphorin-2-sulfide was obtained.

EXAMPLE 3

6.2 grams of o-hydroxybenzyl alcohol was dissolved in 40 ml. of 20% (by weight) sodium hydroxide aqueous solution. During the reaction mixture was stirred vigorously, 10 g. of ethyl phosphorodichloridodithioate was slowly added dropwise. After stirring for two hours the reaction product was extracted by chloroform. In the similar way of the Example 1 the crude 2-ethylthio-4H-1,3,2-benzodioxaphosphorin-2-sulfide was obtained. By vacuum distillation of the crude product, 4.6 g. (yield 40% based on o-hydroxybenzyl alcohol) of the pure product was obtained as the fraction of distillate having the boiling point from 145° C./0.2 mm. Hg to 147° C./0.2 mm. Hg.

In the similar way of any of Example 1 to 3 the compounds shown in the following Table 2 were produced:

TABLE 2

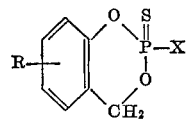

| Example No. | X | R | Reaction temperature (° C.) | Reaction time (hour) | Yield (percent) | Physical properties |
|---|---|---|---|---|---|---|
| 4 | −N(H)(C$_2$H$_5$) | H | 40 | 2 | 70 | Undistillable oil. |
| 5 | −N(C$_2$H$_5$)(C$_2$H$_5$) | H | 50 | 2.5 | 60 | B.P. 118°–120° C./0.2 mm. Hg. |
| 6 | −S−CH$_3$ | H | (¹) | 2.5 | 35 | M.P. 69°–70° C. |
| 7 | −S−CH(CH$_3$)(CH$_3$) | H | 30–35 | 2.5 | 45 | B.P. 140°–143° C./0.1 mm. Hg, N$_D^{25}$ 1.5920. |
| 8 | −S−CH$_2$−CH=CH$_2$ | H | 20–30 | 2.5 | 20 | B.P. 140°–147° C./0.3 mm. Hg, N$_D^{25}$ 1.6305. |
| 9 | −S−CH$_2$(CH$_2$)$_2$−CH$_3$ | H | 20–30 | 2.5 | 50 | B.P. 160°–167° C./0.25 mm. Hg, N$_D^{25}$ 1.5870. |

| Example No. | X | R | Reaction temperature (° C.) | Reaction time (hour) | Yield (percent) | Physical properties |
|---|---|---|---|---|---|---|
| 10 | —S—<phenyl> | H | 30–40 | 2.5 | 35 | M.P. 79°–80° C. |
| 11 | —OCH₃ | 8-Cl | 40–50 | 2 | 40 | M.P. 72°–73° C. |
| 12 | —SCH₃ | 6-Cl | 40–50 | 2 | 40 | B.P. 160°–165° C./0.2 mm. Hg. |

[1] Below 10.

NOTE.—The compounds of Examples 6 to 12 are novel compounds.

What we claim is:

1. 2 - methylthio-4H-1,3,2-benzodioxaphosphorin-2-sulfide.
2. 2 - ethylthio - 4H-1,3,2-benzodioxaphosphorin-2-sulfide.
3. 2 - isopropylthio-4H-1,3,2-benzodioxaphosphorin-2-sulfide.
4. 2 - allylthio - 4H-1,3,2-benzodioxaphosphorin-2-sulfide.
5. 2 - butylthio-4H-1,3,2-benzodioxaphosphorin-2-sulfide.
6. 2 - phenylthio-4H-1,3,2-benzodioxaphosphorin-2-sulfide.
7. 2 - methylthio - 6-chloro-4H-1,3,2-benzodioxaphosphorin-2-sulfide.
8. A process for producing cyclic thionophosphate esters represented by the formula,

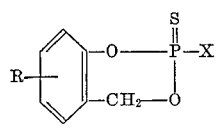

wherein X means methoxy, an alkylthio having one to four carbon atoms, allylthio, phenylthio, or a radical represented by the formula,

wherein $R^1$ means an alkyl having two to four carbon atoms, or a radical represented by the formula,

wherein $R^2$ and $R^3$ mean an alkyl having one to four carbon atoms and R means hydrogen, chlorine or methyl; which comprises reacting an o-hydroxybenzyl alcohol represented by the formula,

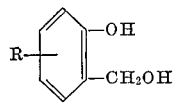

wherein R has the same meaning as defined above; with a mono-substituted thiophosphoryl chloride represented by the formula,

wherein X has the same meaning as defined above, in an aqueous sodium hydroxide or potassium hydroxide solution of the concentration of from 1% to 40% by weight at a temperature of from 0° C. to 50° C.

9. A process according to claim 8, wherein the temperature is from 5° C. to 30° C.
10. A process according to claim 8, wherein the concentration of the aqueous sodium hydroxide or potassium hydroxide solution is from 10% to 30% by weight.
11. A process according to claim 8, wherein the cyclic phosphate ester is 2 - methoxy-4H-1,3,2-benzodioxaphosphorin-2-sulfide.
12. A process according to claim 8, wherein the cyclic phosphate ester is 2-dimethylamino-4H-1,3,2-benzodioxaphosphorin-2-sulfide.
13. A process according to claim 8, wherein the cyclic phosphate ester is 2-ethylthio-4H-1,3,2-benzodioxaphosphorin-2-sulfide.
14. In the process for producing cyclic thionophosphate esters represented by the formula,

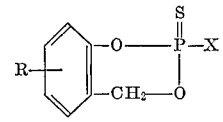

wherein X means methoxy, an alkylthio having one to four carbon atoms, allylthio, phenylthio, a radical represented by the formula,

wherein $R^1$ means an alkyl having two to four carbon atoms, or a radical represented by the formula,

wherein $R^2$ and $R^3$ mean an alkyl having one to four carbon atoms and R means hydrogen chlorine or methyl, by the reaction of an o-hydroxybenzyl alcohol represented by the formula,

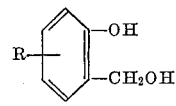

wherein R has the same meaning as defined above; with a mono-substituted thiophosphoryl chloride represented by the formula,

wherein X has the same meaning as defined above; an improvement which comprises effecting the reaction in an aqueous sodium hydroxide or potassium hydroxide solution of the concentration of from 1% to 40% by weight at a temperature of from 0° C. to 50° C.

References Cited

UNITED STATES PATENTS

| 2,928,864 | 3/1960 | Tabor | 260—973 |
| 2,945,052 | 7/1960 | Alexander | 260—973 |
| 3,235,448 | 2/1966 | Oshima et al. | 260—973 XR |

FOREIGN PATENTS

| 1,439,407 | 4/1966 | France. |

CHARLES B. PARKER, Primary Examiner

A. H. SUTTO, Assistant Examiner

U.S. Cl. X.R.

260—973, 999